(12) United States Patent
Gunasekara et al.

(10) Patent No.: US 10,887,771 B2
(45) Date of Patent: *Jan. 5, 2021

(54) ACCESS CONTROL, ESTABLISHING TRUST IN A WIRELESS NETWORK

(71) Applicant: Time Warner Cable Enterprises LLC, Saint Louis, MO (US)

(72) Inventors: Don Gunasekara, Reston, VA (US); Harriet DuBois, Herndon, VA (US); Kevin Caldwell, Vienna, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,456

(22) Filed: Sep. 16, 2018

(65) Prior Publication Data
US 2019/0045365 A1 Feb. 7, 2019

Related U.S. Application Data

(63) Continuation of application No. 13/793,511, filed on Mar. 11, 2013, now Pat. No. 10,104,554.

(51) Int. Cl.
*H04L 29/06* (2006.01)
*H04W 12/12* (2009.01)
*H04W 84/12* (2009.01)
*H04W 12/00* (2009.01)

(52) U.S. Cl.
CPC .......... *H04W 12/12* (2013.01); *H04L 63/126* (2013.01); *H04W 12/00514* (2019.01); *H04W 12/00522* (2019.01); *H04W 84/12* (2013.01)

(58) Field of Classification Search
CPC .............. H04W 12/12; H04W 84/12; H04W 12/00522; H04W 12/00514; H04L 63/126
See application file for complete search history.

(56) References Cited

U.S. PATENT DOCUMENTS

| | | | |
|---|---|---|---|
| 6,636,491 B1* | 10/2003 | Kari | H04L 61/2084 370/328 |
| 7,564,960 B2* | 7/2009 | Urban | H04L 47/10 379/142.01 |
| 7,593,365 B1 | 9/2009 | Delker et al. | |
| 7,924,740 B2* | 4/2011 | Grammel | H04L 41/00 370/254 |
| 8,817,712 B2* | 8/2014 | Shin | H04W 4/00 370/329 |
| 9,191,795 B2* | 11/2015 | Langevin | H04W 4/16 |
| 9,224,272 B2* | 12/2015 | Morris | G06Q 20/10 |
| 9,325,566 B2* | 4/2016 | Patil | H04L 63/10 |
| 2004/0198220 A1 | 10/2004 | Whelan et al. | |
| 2005/0021725 A1* | 1/2005 | Lobbert | H04W 48/16 709/223 |
| 2007/0277224 A1 | 11/2007 | Osborn et al. | |
| 2008/0082821 A1* | 4/2008 | Pritikin | G06F 17/243 713/169 |
| 2009/0047930 A1 | 2/2009 | Krishnaswamy et al. | |

(Continued)

*Primary Examiner* — Ghodrat Jamshidi
(74) *Attorney, Agent, or Firm* — Armis IP Law, LLC

(57) ABSTRACT

A wireless access point provides a subscriber access to use of a core network. Several techniques are implemented to build trust that the subscriber is connected with and using a safe wireless network. Additional techniques can be used to control use of services provided by the wireless access point.

36 Claims, 10 Drawing Sheets

(56) References Cited

U.S. PATENT DOCUMENTS

| | | | |
|---|---|---|---|
| 2009/0323645 A1* | 12/2009 | Fukami | H04W 56/00 370/338 |
| 2010/0030578 A1* | 2/2010 | Siddique | G06Q 10/0637 705/3 |
| 2010/0106966 A1 | 4/2010 | Santos et al. | |
| 2010/0124213 A1* | 5/2010 | Ise | H04W 12/06 370/338 |
| 2010/0180121 A1* | 7/2010 | Chow | H04L 63/08 713/175 |
| 2011/0176417 A1* | 7/2011 | Kuwabara | H04W 36/22 370/230 |
| 2012/0191522 A1* | 7/2012 | McLaughlin | G06Q 50/01 705/14.23 |
| 2012/0198034 A1* | 8/2012 | Avimeni | H04L 61/1511 709/221 |
| 2012/0202185 A1* | 8/2012 | Jabara | G09B 5/00 434/350 |
| 2013/0247164 A1 | 9/2013 | Hoggan | |
| 2013/0347073 A1 | 12/2013 | Bryksa et al. | |

* cited by examiner

ACCESS CONTROL, ESTABLISHING TRUST IN A WIRELESS NETWORK

RELATED APPLICATION

This application is a continuation of earlier filed U.S. patent application Ser. No. 13/793,511 entitled "ACCESS CONTROL, ESTABLISHING TRUST IN A WIRELESS NETWORK,", filed on Mar. 11, 2013, the entire teachings of which are incorporated herein by this reference.

BACKGROUND

Conventional computer devices typically have the ability to identify a presence of WiFi™ access points. For example, according to current technology, to learn of one or more access points in a region, a computer device transmits a wireless query signal. In response to the wireless signal, any of one or more active WiFi™ network access points in the region will respond with information indicating their identities. Accordingly, via the response information from the access points, the operator of the computer can identify which, if any, WiFi™ networks are available for use in the region.

After identifying available WiFi™ networks, the computer device can initiate display of the identities of the different WiFi™ networks on a display screen. In such an instance, the user of the computer can manually select from a listing of the available WiFi™ networks in which to connect. In certain instances, the user may need to provide an appropriate password to be granted access to the Internet through the selected WiFi™ access point.

It is not uncommon for a business such as a coffee shop, hotel, etc., to provide free access WiFi™ services. Unfortunately, for good reasons, computer users are sometimes suspicious of using open WiFi™ services because it is easy for someone to create a fraudulent wireless access service using a rogue WiFi™ access point cell sites. Instead of connecting to a free WiFi™ service in a respective coffee shop, a user may unknowingly connect to a rogue WiFi™ access point. In such an instance, when a computer user uses the fraudulent wireless access service, unbeknownst to the computer user, a hacker may be listening to communications between the computer user and a corresponding target server. If the hacker is able to eavesdrop and obtain private information such as a bank account of the user and a corresponding password, it may be possible for the hacker thereafter to use the fraudulently obtained personal information to steal money from the computer user's bank account.

BRIEF DESCRIPTION OF EMBODIMENTS

As discussed above, conventional applications suffer from a number of deficiencies. For example, conventional use of open WiFi™ access points to obtain Internet access are prone to identity theft and subsequent improper user of a user's personal information.

Embodiments herein deviate with respect to conventional techniques. For example, one embodiment herein is directed to building user trust such that a respective user feels comfortable using a particular WiFi™ access point to access a respective network such as the Internet.

According to one embodiment of building trust in a wireless network environment, a server resource (such as a web-portal application server) receives a communication from a wireless base station such as a wireless access point. The server resource processes the communication to identify a network address of a computer device communicating over a wireless network connection through the wireless access point. The server resource initiates display of a notification on a display screen of the computer device to indicate an identity of a corresponding service provider that supports the wireless network connection provided to the computer device. Accordingly, a computer user may operate a computer device to establish a wireless communication link with the wireless access point. Via the display notification, the server resource informs the user that the wireless access point is part of a particular service provider's network. The notification can therefore serve as a way to notify the user that the/she is connected to a safe network, free from attacks.

In accordance with another embodiment of building trust in a wireless network, a server resource (such as a web-portal application server) receives a communication from a wireless access point. The wireless access point provides a corresponding computer device access to a core network to which the wireless access point is communicatively coupled. On behalf of a user (such as a subscriber) operating the computer device, the server resource retrieves display information (e.g., an image, symbol, text, etc.) previously inputted by the subscriber during registration. The display information can be personal information selected by the user during registration. The server resource initiates transmission of the display information through the wireless access point to the computer device operated by the user. The computer device displays a rendition of the display information on the display screen of the corresponding computer device for viewing by the subscriber. Accordingly, via the rendition of the display information provided by a user during registration, the user knows that the wireless access point and/or core network is safe and owned and/or operated by a respective service provider's network to which the user subscribes.

Further embodiments herein can include a computer device operated by a user that establishes a wireless communication link with a wireless access point such as a WiFi™ access point. In accordance with user input, the computer device transmits a first request for content over the wireless communication link and through the wireless access point to retrieve content from a server resource. For example, after creating an association with a wireless access point, the computer user may request retrieval of a particular web page. In one embodiment, in response to the first request, and instead of being served the requested content as specified by the first request, the computer device receives a redirect message. As specified by the redirect message, the computer user transmits a second request over the wireless communication link and through the wireless access point. By way of a non-limiting example, the second request can be configured to retrieve a service provider authentication page associated with the access point. Accordingly, a user may attempt use of services provided by the wireless access point and be served an authentication page. Via the authentication page, the user provides appropriate personal information as a condition for subsequent use of the wireless access point to retrieve content from a core network.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: establish a wireless communication link with a wireless access point; transmit a first request over the wireless communication link and through the wireless access point to retrieve content from a server resource; in response to the first request, receive a redirect message; and as specified by the redirect message, transmit a second request over the wireless communication link and through the wireless access point to retrieve a service provider authentication page.

Yet another embodiments herein includes a computer readable storage medium and/or system having instructions stored thereon. The instructions, when executed by a processor of a respective computer device, cause the processor or multiple processors of the system to: receive a communication from a wireless access point, the wireless access point providing a corresponding computer device access to a core network to which the wireless access point is communicatively coupled; retrieve display information previously inputted by a subscriber operating the corresponding computer device; and initiate display of a rendition of the display information on a display screen of the corresponding computer device for viewing by the subscriber, the display information indicating that the wireless access point is part of a network to which the subscriber subscribes.

Still yet another embodiment herein includes a computer readable storage medium and/or system having instructions stored thereon. Such instructions, when executed by a processor of a respective computer device, cause the processor or multiple processors of the system to: receive a communication from a wireless access point; process the communication to identify a network address of a computer device communicating through the wireless access point; and initiate display of a notification on a display screen of the computer device, the notification indicating an identity of a service provider supporting the wireless network connection provided to the computer device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for building trust and/or controlling access in wireless network environments. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Figure 1:
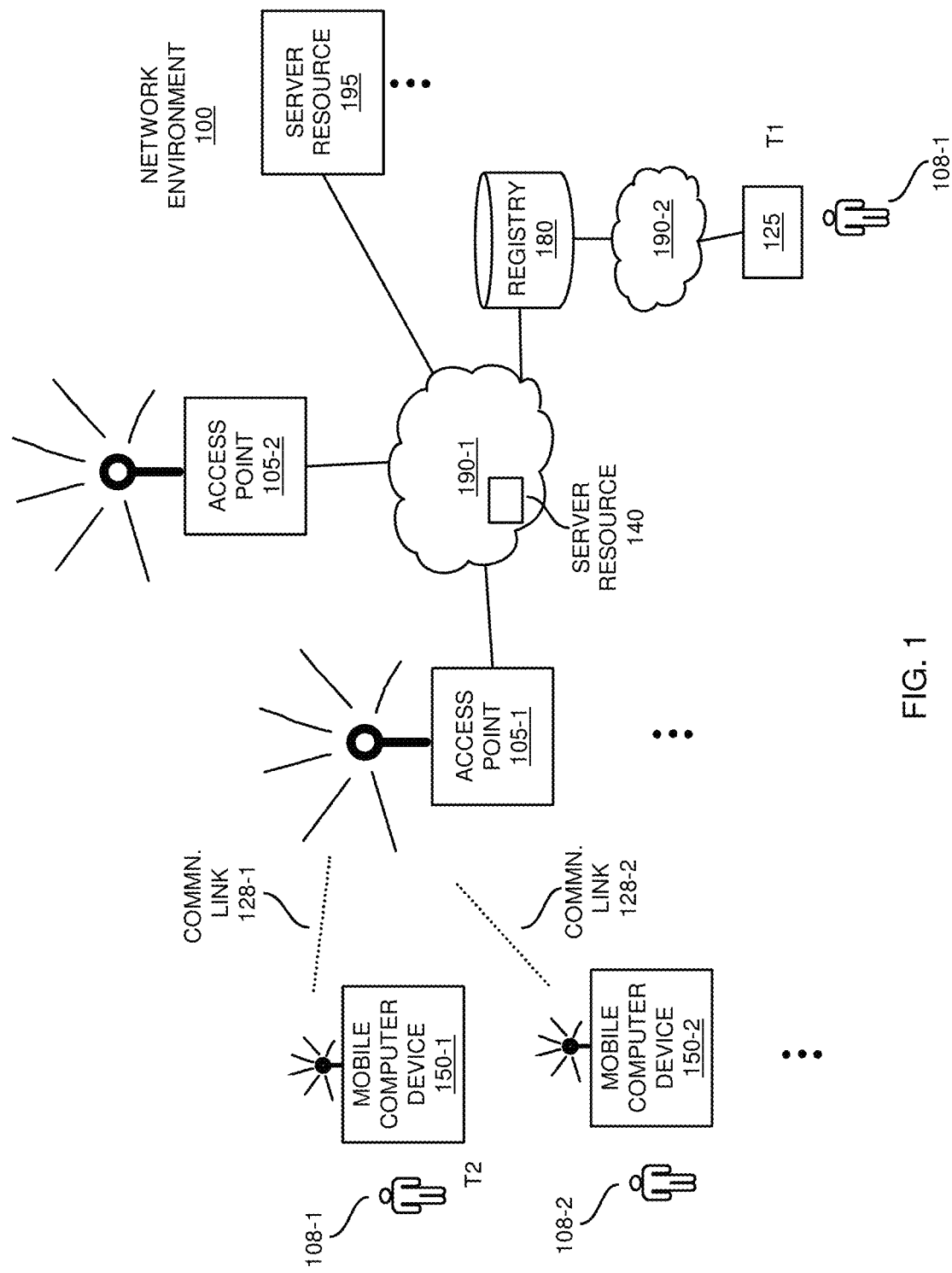
FIG. 1 is an example diagram illustrating a network environment according to embodiments herein.

Now, more specifically, FIG. 1 is an example diagram illustrating a network environment according to embodiments herein.

As shown, network environment 100 includes multiple computer devices 150 (e.g., computer device 150-1, computer device 150-2, etc.), multiple wireless access points 105 (e.g., access point 105-1, access point 105-2, ... ), network 190-1, server resource 140, server resource 195, registry 180, network 190-2, computer device 125, and end user 108 (e.g., multiple users).

By way of a non-limiting example, each of computer devices 150 can be stationary or mobile. Computer devices 150 utilize access points 105 as a means to connect to a respective network such as the Internet. By further way of a non-limiting example, access points 105 can be WiFi™ access points or wireless base stations configured to support wireless communications such as those according to a WiFi™ protocol such as 802.11.

In one embodiment, the access points are open WiFi™ networks in which any of multiple computer users can attempt to establish a network connection to obtain access to core network and a network such as the Internet. As discussed herein, the access points and other resources in the network environment 100 may prevent use of a respective access point. If a user passes authentication, the user may be allowed to use the core network.

As shown, user 108-1 operates computer device 125 to register to use access points 105 in network environment 100. Registration can include executing a browser at the computer device 125 and using the browser to access a respective website of a service provider associated with access points 105.

In one embodiment, at time T1 during registration, via the browser or other suitable resource executing on computer device 125, a respective user inputs personal information for storage in registry 180. By way of a non-limiting example, for each subscriber in network environment 100, respective personal information stored in registry 180 can include information such as: i) a unique network address of each of one or more respective mobile computer devices to be used by the respective user (e.g., subscriber) in network environment 100, ii) a respective unique user identifier or username to be used by the user 108-1, iii) unique password information associated with the user, iv) display information such as one or more security images selected by the user, v) one or more challenge questions and corresponding answers, etc.

Subsequent to registering, at time T2, assume that the user 108-1 operates computer device 150-1 in network environment 100. To communicate over network 190-1 and access available information such as web pages, audio information, etc., the computer device 150-1 establishes a corresponding wireless communication link with a nearby access point in network environment 100.

Assume in this example that the computer device 150-1 establishes a wireless communication link 128-1 with access point 105-1, which supports WiFi™ communications.

Depending on a configuration, the access points 105 can support different types of communications. For example, one or more of the access points 105 can provide access to the Internet.

Access points 105 may provide public or private access services. For example, in certain instances, any of one or more access points 105 in network environment 100 may support free WiFi™ access services to users.

Additionally, any of one or more access points 105 in network environment 100 may be subscription-based. In this latter instance, the user may be required to pay a fee, be a member of an organization, subscribe to other services, etc., in order to be granted use of the access points 105.

Via communications over wireless communication link 128-1, through network 190-1 (such as a core network), the computer device 150-1 is able to retrieve content from different sources in network 190-1. As mentioned, by way of a non-limiting example, network 190-1 can include and/or provide access to the Internet.

Figure 3:
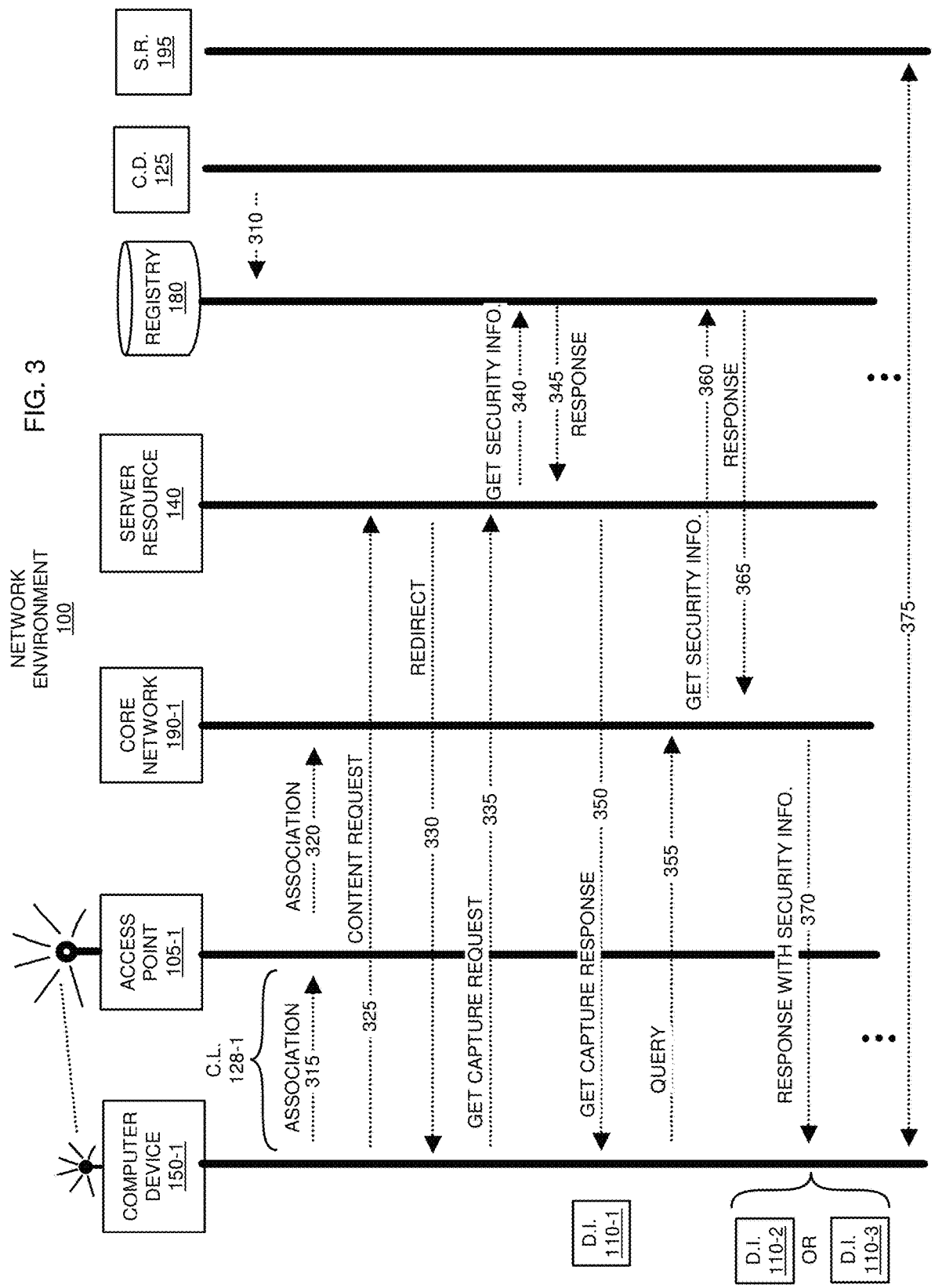
FIG. 3 is an example diagram illustrating communications according to embodiments herein.

More specific details of utilizing the access points 105 to access the network 190-1 are discussed in FIG. 3.

Figure 2:
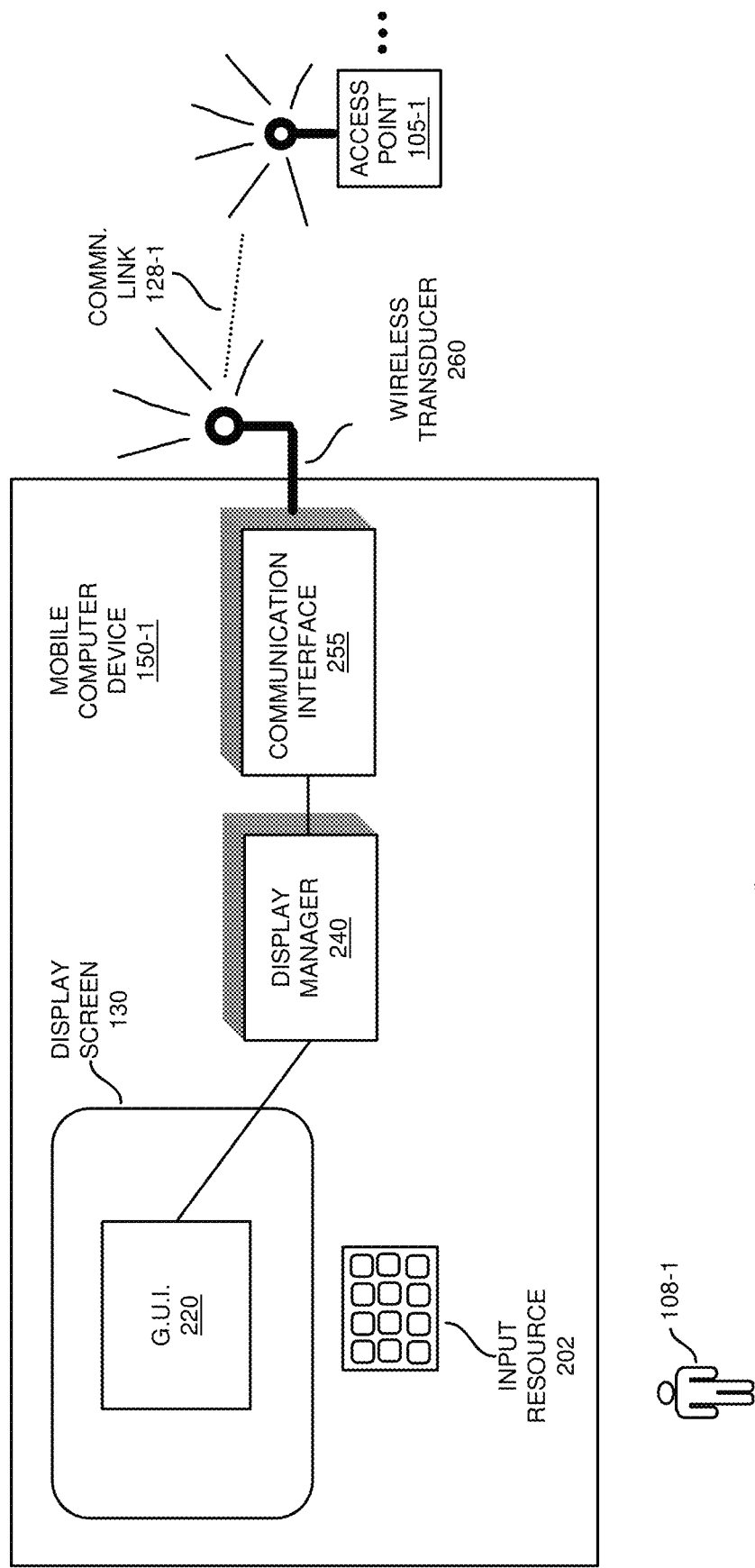
FIG. 2 is an example diagram illustrating a computer device configured to communicate over a wireless access point according to embodiments herein.

FIG. 2 is an example diagram illustrating a computer device configured to connect to and communicate over a WiFi™ access point according to embodiments herein.

As shown, the computer device 150-1 (e.g., any type of computer device) used by a respective user 108-1 can include appropriate hardware and software supporting functions such as communicating through a respective access point to retrieve content and displaying retrieved content on a display screen.

As a specific example, user 108-1 provides input to the computer device 150-1 via input resources 202. Input resources 202 can include a keyboard, touch-screen interface, microphone, computer mouse, mouse pad, etc., enabling the user 108-1 to control operations of mobile computer device 150-1.

Assume in this example that the user 108-1 provides input to launch a respective graphical user interface 220 (such as a browser) for display on display screen 130. Display manager 240 initiates display of the graphical user interface 220 and corresponding images on display screen 130-1.

Computer device 150-1 includes communication interface 255. In accordance with input to the graphical user interface 220 from user 108-1, the display manager 240 initiates retrieval of requested content via communications through communication interface 255 over wireless communication link 128-1 to access point 105-1.

Subsequent to transmitting a respective content request over communication link 128-1, communication interface 255 receives requested content over wireless communication link 128-1 from access point 105-1. Display manager 240 initiates playback of the retrieved content (e.g., images, audio, etc.) on display screen 130 for viewing by the respective user 108-1.

By further way of a non-limiting example, each of computer devices 150 can be or include any suitable resource such as a mobile communication device, phone, personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, wireless transducer 260, etc.

FIG. 3 is an example diagram illustrating communications according to embodiments herein. Note that the ordering of the communications is shown by way of non-limiting example only and that the communications to control access and build trust can vary depending on the embodiment.

Via communications 310, the user 108-1 registers and inputs appropriate information to registry 180. In one embodiment, communications 310 support registration as discussed above.

One convenient way of entering information to registry 180 is a web browser. Via a web page retrieved from registry 180 and displayed in a respective browser of computer device 125 or other suitable resource such as computer device 150-1, the respective user inputs personal information for storage in registry 180.

The personal information from user 108-1 can include information such as a unique network address of each of one or more respective mobile computer devices to be used by the respective user (e.g., subscriber) in network environment 100.

Assume in this example that the network address of computer device 150-1 is 06-54-00-00-00-01. During registration, the user inputs the unique identifier or network address (such as a MAC address) or other suitable resource of computer device 150-1 to registry 180. The registry 180 stores this unique network address for the respective user 108-1.

The registry 180 can be configured to store any number of unique network addresses associated with corresponding computer devices used by the respective subscriber (e.g., user 108-1).

Additionally, in this non-limiting example embodiment, the user 108-1 can be required to input password and username information to the registry 180. A username associated with the user 108-1 can be a unique sequence of text (such as a respective user's e-mail address) that is easily remembered by the user 108-1. A password can be any suitable value (e.g., a sequence of one or more numbers, letters, images, etc.) provided by the user 108-1.

In accordance with further embodiments, via communications 310, the user 108-1 can provide additional information such as security information. For example, the user 108-1 can provide or select display information such as one or more security images, security hints, one or more challenge questions and corresponding answers, etc.

Via a relationship map, the registry 180 associates and stores the received information about a particular subscriber such as device network address information (e.g., computer device 150-1 is assigned network address 06-54-00-00-00-01) associated with a respective computer device operated by the user, username information (e.g., John@TWC.com), password information (e.g., ACE9832), security information (e.g., selected image information, challenge question and response, etc.).

Subsequent to providing registration information, assume that the user 108-1 operates computer device 150-1 (such as a mobile device) to access a respective access point 105 in network environment 100. In such an instance, the computer device 150-1 and respective user 108-1 can learn of the presence of the access point 105-1 via a discovery protocol in which the access point 105-1 broadcasts wireless notifications. The computer device 150-1 receives the broadcast message(s) from the access point 105-1.

Via communications 315 and 320, the computer device 150-1 associates with the access point 105-1 to become a client and establish the wireless communication link 128-1. Association can include transmitting the network address 06-54-00-00-00-01 of the computer device 150-1 to the access point 105-1. Additional communications that occur during association can include agreement between the computer device 150-1 and access point 105-1 of the communication parameters (e.g., data rate, security, etc.) to establish a respective wireless communication link 128-1. Thus, in one embodiment, association sets the stage to support future communications between a computer device 150-1 and the respective access point.

In this example, subsequent to establishing the wireless communication link 128-1, assume that the user 108-1 of computer device 150-1 transmits a content request via communications 325. The content request may be a request to retrieve a particular web page such as Google.com.

By way of a non-limiting example, the computer device 150-1 can transmit the content request over the wireless communication link 128-1 in accordance with an unsecured communication protocol such as HTTP (Hypertext Transfer Protocol).

In this non-limiting example embodiment, the access point 105-1 receives the content request and forwards the request through core network 190-1 to server resource 140. The content request may have specified to retrieve content from server resource 195. Rather than serve the requested content to the computer device 150-1, the server resource 140 receives and/or intercepts the content request generated by computer device 150-1.

In response to receiving the content request, via communications 330, the server resource 140 such as a web-portal application server generates and transmits a redirect message to the computer device 150-1.

Access point 105-1 receives the redirect message and forwards it over wireless communication link 128-1 to computer device 150-1.

The computer device 150-1 processes the received redirect message. As specified by the redirect message (e.g., communications 330) received from server resource 140, the computer device 150-1 transmits a second request (e.g., a get capture request) via communications 335 over the wireless communication link 128-1 and through the access point 105-1.

By way of further non-limiting example, the computer device 150-1 can transmit the second request (e.g., get capture request) over the wireless communication link 128-1 in accordance with a secured network communication protocol such as HTTPS (Hypertext Transfer Protocol Secure).

In one embodiment, the computer device 150-1 can be configured to generate the second request as a get capture request to retrieve a service provider's authentication page from a web portal as specified by the received redirect message (e.g., communications 330). The communications 330 can indicate to communicate the Get Capture Request (e.g., communications 335) in accordance with HTTPS. Accordingly, embodiments herein can include transmitting a redirected message (e.g., get capture request) in response to an initial attempt by the computer device 150-1 to retrieve a web page (e.g., google.com) via unsecured communications through the access point 105-1.

Access point 105-1 receives and transmits the get capture request (e.g., second request generated in response to the redirect) to the server resource 140. Server resource 140 receives the get capture request (e.g., redirected communication) generated by computer device 150-1. The get capture request message transmitted by the access point 105-1 to the server resource 140 can include the unique network address (e.g., 06-54-00-00-00-01) of the computer device 150-1 associated with a unique network address of the access point 105-1 transmitting the message. Accordingly, the corresponding web portal knows the network address of the computer device 150-1 generating the request as well as the access point that conveys the get capture request.

In one embodiment, via processing of the received message (e.g., the get capture request message in communications 335), the server resource 140 (such as a web portal application server) is able to identify the unique network address of the computer device 150-1 generating the request as well as detect which of the multiple access points 105 the computer device 150-1 is wirelessly coupled.

Based on the unique network address of the computer device 150-1, and via further communications 340, the server resource 140 communicates with registry 180 to retrieve information associated with the subscriber that operates computer device 150-1. In one embodiment, the registry 180 maps the unique network address of the computer device 150-1 to any of one or more of the following subscriber information: subscriber identity, subscriber username, password information, security information, finger print signatures, etc.

Via communications 345, the server resource 140 receives any or all of the user's information from registry 180.

The server resource 140 produces a get capture response including information to display a service provider authentication page. The server resource 140 transmits the get capture response to the computer device 150-1. The computer device 150-1 initiates display of the service provider authentication page.

Figure 4:
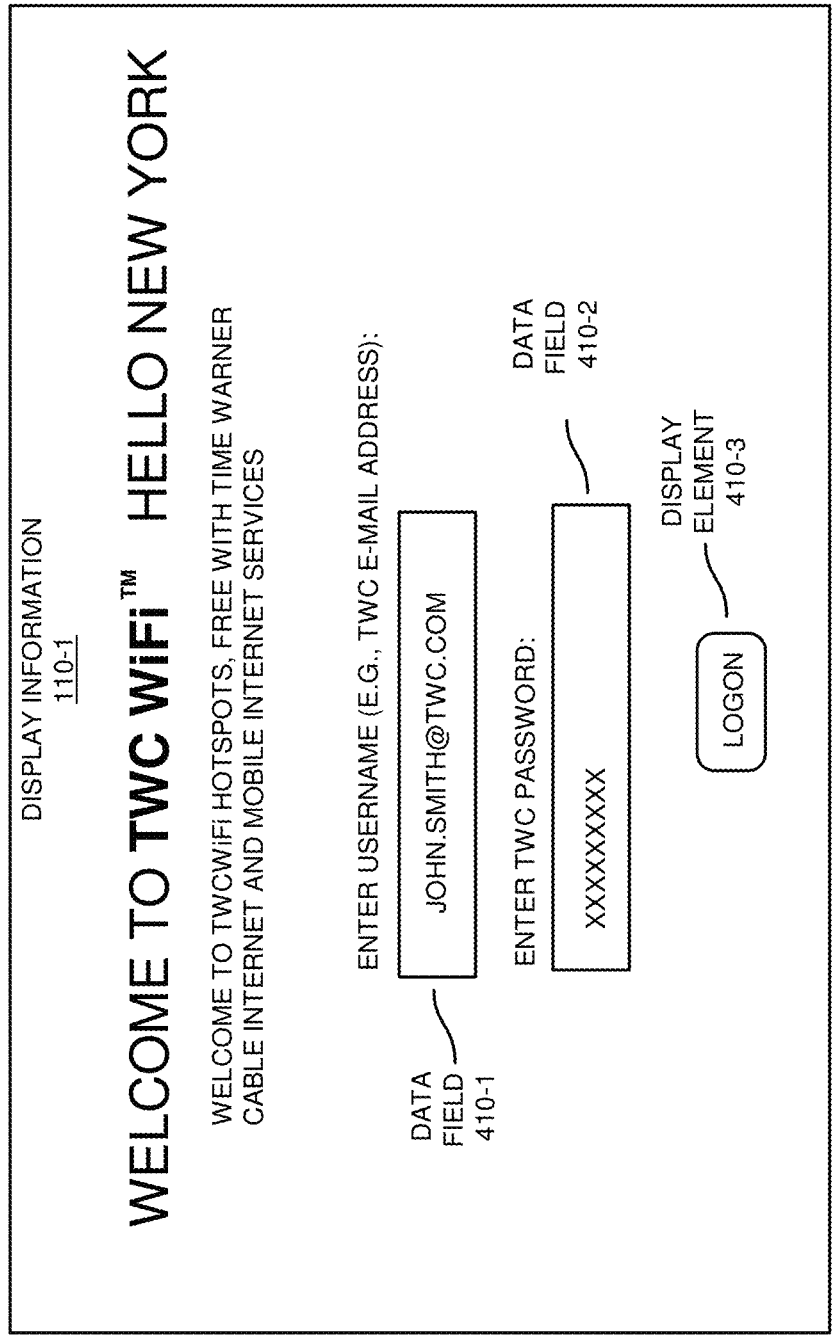
FIG. 4 is an example diagram illustrating a service provider authentication page according to embodiments herein.

In one embodiment, the get capture response includes display information 110-1 as shown in FIG. 4. Via communications 350 from the server resource 140 to the computer device 150-1, the computer device 150-1 initiates display of a rendition of z display information 110-1 such as a web page on display screen 130.

Communications 350 can include unique network address information associated with the access point 105-1 as well as unique network address information associated with the computer device 150-1 for routing purposes. The core network 190-1 is able to route the communications 350 to the access point 105-1 via the unique network address information associated with the access point 105-1. The access point 105-1 is able to forward the communications 350 to the computer device 150-1 based on the unique network address of the computer device 150-1 in the communications 350.

Thus, via communications 350 such as the get capture response to the computer device 150-1 in FIG. 3, the server resource 140 is able to initiate display of a respective notification (as shown in FIG. 4) on the display screen 130 of the computer device 150-1. By way of a non-limiting example, as shown, the notification can indicate an identity of a service provider (e.g., Welcome to TWC WiFi™) supporting the WiFi™ network connection (e.g., wireless communication link 128-1) and respective services provided to the computer device 150-1. That is, the display information 110-1 displayed on display screen 130 indicates that access point 105-1 is a free service as part of certain TWC™ services. Note that the wireless access services alternatively may be fee-based as well.

Accordingly, via a respective service provider symbol, logo, text, etc., in display information 110-1 in FIG. 4 as displayed on display screen 130, and as a response to an initial request for content such as google.com, the user 108-1 is notified that the access point 105-1 is part of a network to which the subscriber subscribes. In one embodiment, the rendition of the display information 110-1 on the display screen 130 notifies the subscriber that the access point 105-1 (currently used by the computer device 150-1) is a safe network over which to communicate.

In addition to notifying the user of the identity of the service provider, the communications 350 through the WiFi™ access point 105-1 back to the computer device 150-1 also presents a challenge to the network subscriber (e.g., user 108-1) to provide security information (e.g., password, username, etc.).

In this non-limiting example embodiment of FIG. 4, the rendition of display information on display screen 130 prompts the user 108-1 to provide his respective username in data field 410-1. The rendition of display information 110-1 on display screen 130 prompts the user 108-1 to provide his respective password in data field 410-2. The user then selects display element 410-3 (logon symbol) to enter the username and password information to log on.

Referring again to FIG. 3, subsequent to selecting display element 410-3, via communications 355, the user inputs the security information (e.g., username, password, etc.) to the service provider authentication page.

Server resource 140 verifies whether the received security information (e.g., username and password or other suitable input such as fingerprint signature information from the user 108-1 and/or computer device 150-1 is correct or not. If the provided password of fingerprint signature is incorrect, the server resource can prevent the respective user from using any of the access points 105 to access network 190-1.

Via further communications 360, in addition to password (or finger print) checking, server resource 140 may also verify whether the user 108-1 is up-to date on paying bills, determine what services are available to user 108-1, etc. Use of the access points 105 may be terminated if the user is not up-to-date paying bills. Thus, embodiments herein can include controlling use of one or more WiFi™ access points and access to a respective network.

Additionally, after the initial authentication, via communications 360 and 365, the server resource 140 can be configured to obtain additional personal information, challenge, etc., associated with the user 180-1. For example, via communications 360, the server resource 140 can transmit a get security information request to registry 180. In response to receiving the get security information request, via communications 365, the registry 180 transmits corresponding display information 110 to server resource 140.

Via communications 370, the server resource 140 transmits the retrieved display information (e.g., display information 110-2 in FIG. 5 or display information 110-3 in FIG. 6) in the response with security information to computer device 150-1. The computer device 150-1 initiates display of the received display information.

Figure 5:
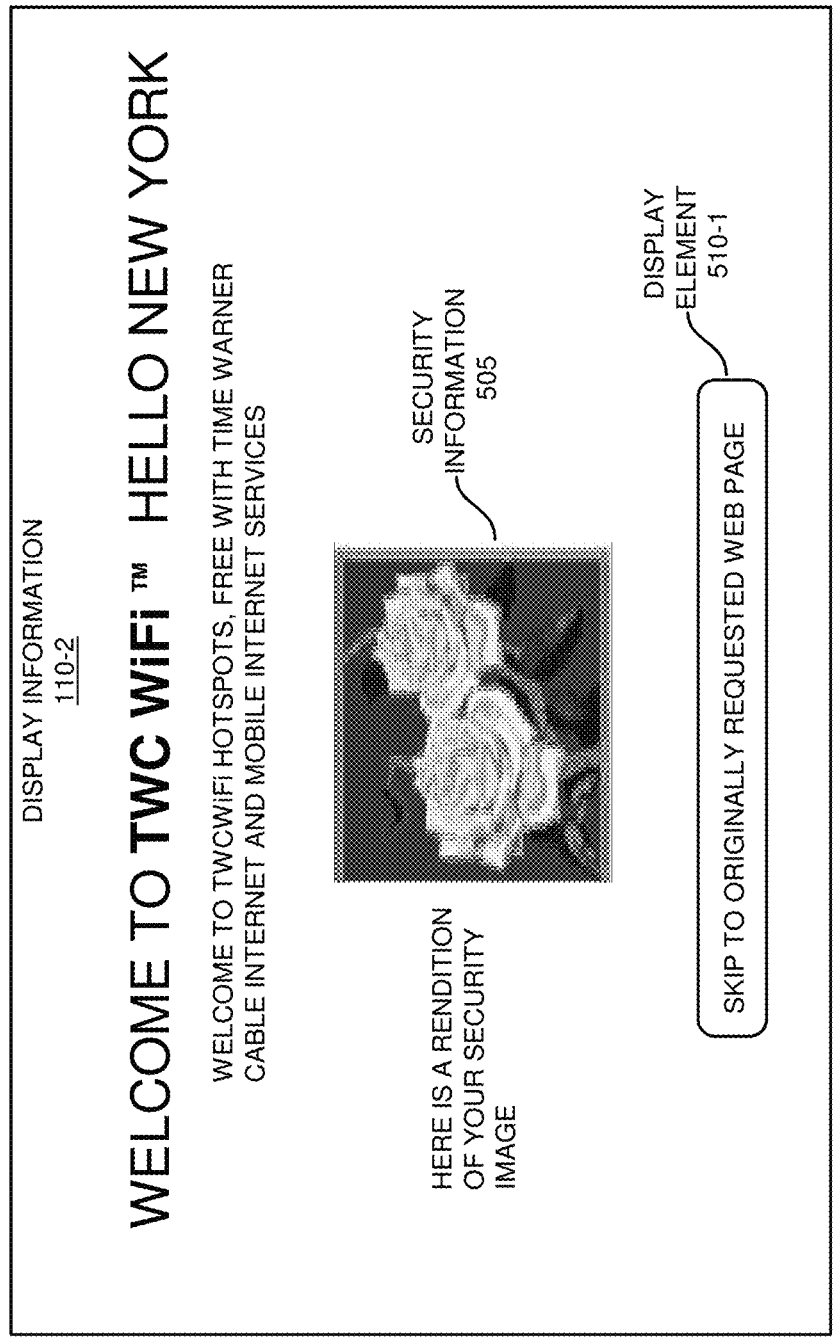
FIG. 5 is an example diagram illustrating display of security information according to embodiments herein.

In one non-limiting example embodiment, the communications 370 can include the display information 110-2 in FIG. 5. As shown, the display information 110-2 can include a rendition of security information 505 (i.e., information previously inputted by the user 108-1 during registration). As shown, display information 110-2 also can include a display of notification of successful authentication of the operator at the computer device. In other words, because the user 108-1 provided the appropriate username and password, the display of security information 505 indicates that the user 108-1 was properly authenticated. In one embodiment, if the user 108-1 did not provide the appropriate security information, then the server resource 140 would not send the security information 505 for display on display screen 130.

User 108-1 can select the display element 510-1 in the rendition of display information 110-2 to skip to originally requested web page (e.g., google.com). In one embodiment, after a predetermined timeout (such as 5 seconds) of displaying display information 110-2, the computer device 150-1 can be automatically redirected to the original web page.

Figure 6:
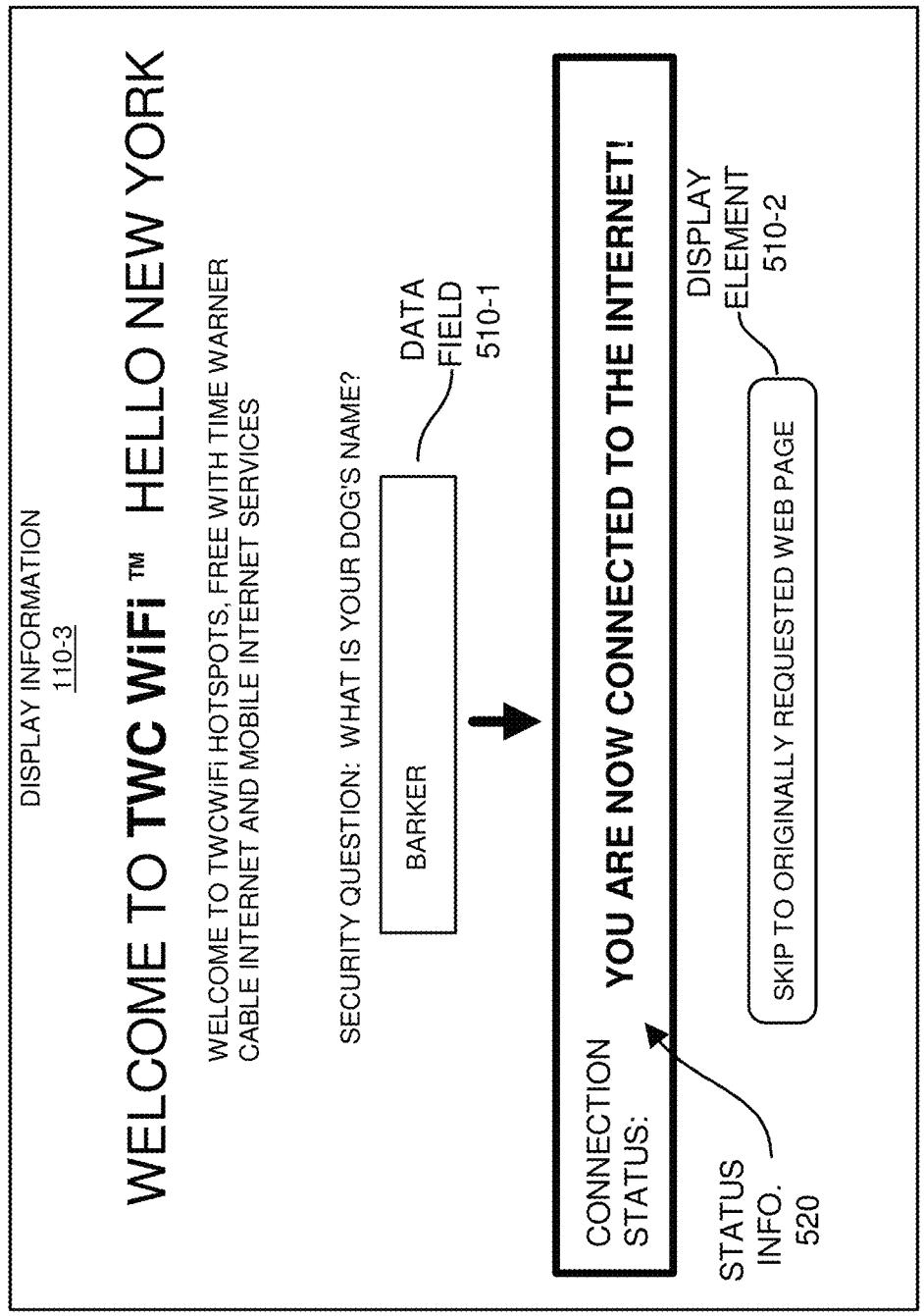
FIG. 6 is an example diagram illustrating a supplemental challenge page according to embodiments herein.

In an alternative embodiment, instead of receiving display information 110-2 via communications 370, the computer device 150-1 may receive display information 110-3 as shown in FIG. 6. In a manner as previously discussed, upon receipt, the computer device 150-1 initiates display of a rendition of the display information 110-3 in FIG. 6 on display screen 130 for viewing by the user 108-1.

As shown, the rendition of display information 110-3 can include another challenge. Display of the second challenge on display screen 130 provides notification of successful authentication of the operator (i.e., user 108-1) of the computer device.

In this example, the challenge in display information 110-3 is to provide an answer to the question "What is your dog's name?" The user 108-1 previously picked this question and corresponding correct answer "Barker" during registration (e.g., communications 310. In one embodiment, when fingerprint information is used as a verification option, a so-called change question may not be asked since correlation of the signature is performed internal to a respective server performing the verification.

Assume in this example that the user 108-1 provides input (e.g., security information) "Barker" in data field 510-1 in response to the displayed query "What is your dog's name?" Computer device 150-1 transmits this information to server resource 140. Since the user 108-1 provides the proper answer (i.e., Barker), server resource 140 initiates display of status information 520 (e.g., the message "You are now connected to the Internet") on display screen 130 indicating that the user 108-1 and corresponding computer device 150-1 is now connected for use of the Internet via the wireless communication link 128-1.

If desired, after providing display information 110-2 or display information 110-3, the computer device 150-1 can automatically be redirected to obtain the originally requested web page (e.g., google.com) as specified by the content request in communications 325. Thus, in accordance with one embodiment, subsequent to providing appropriate security information such as a username and password, the computer device 150-1 can receive the content from the original request over the wireless communication link 128-1 through the access point 105-1. For example, as shown in FIG. 3, subsequent to verification, the user 108-1 is able to access content from server resource 195 via communications 375.

Note again that the ordering of the communications in FIG. 3 is shown by way of non-limiting example only and that the order of communications can vary depending on the embodiment. For example, the server resource 140 can be configured to retrieve the personal information associated with a respective subscriber subsequent to serving the service provider authentication page. If desired, the inputted information such as a username in the service provider authentication page can be used as a basis to identify a corresponding subscriber. Based on the inputted username information, if the corresponding password provided by the user is correct through the service provider authentication page, the server resource 140 can be configured to retrieve the display information associated with user to display the security question, hint, etc.

Figure 7:
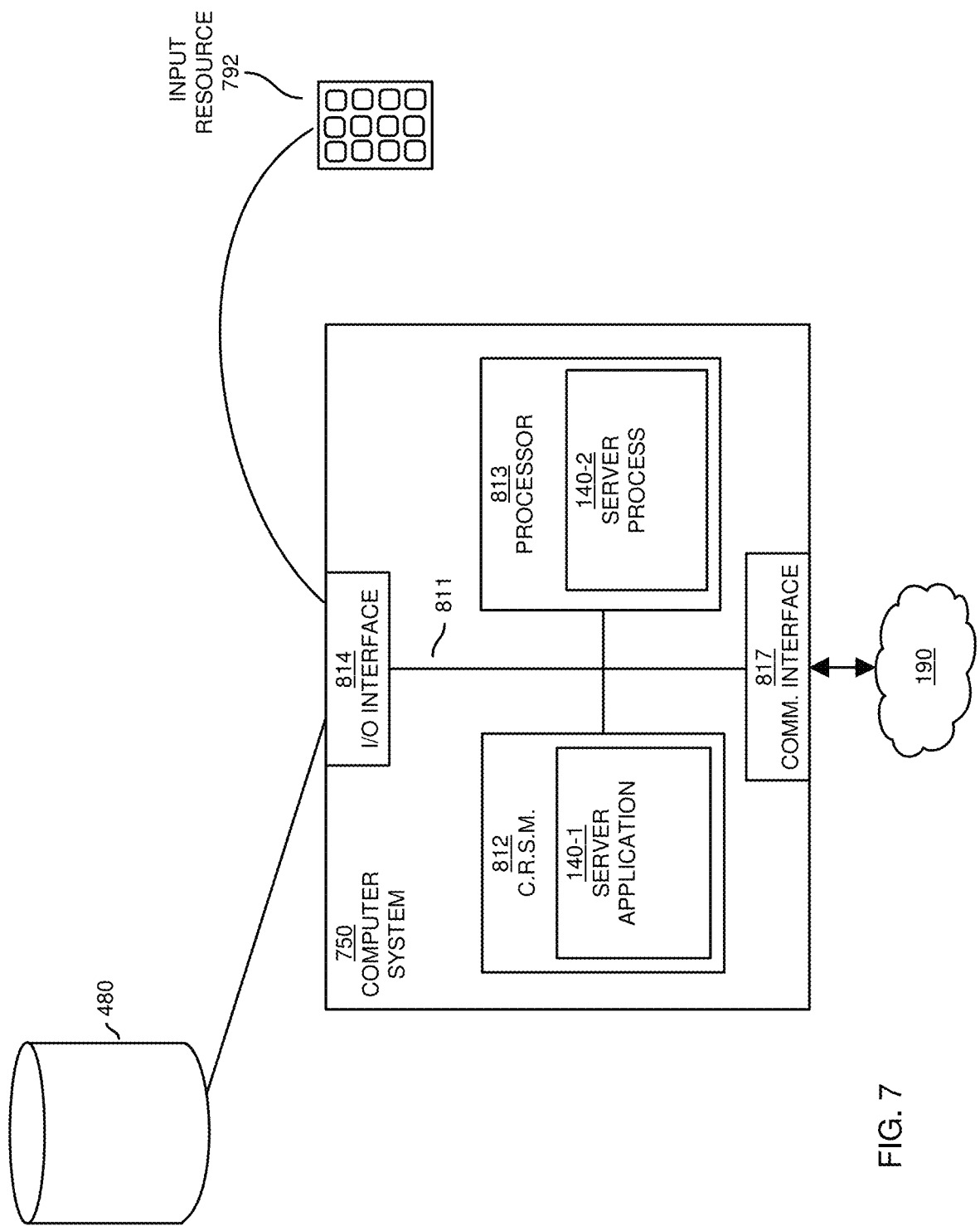
FIG. 7 is a diagram illustrating an example computer architecture in which to execute any of the functionality according to embodiments herein.

FIG. 7 is an example block diagram of a computer device for implementing any of the operations as discussed herein according to embodiments herein.

As shown, computer system 750 such as a computer device operated by the user, a server resource, a wireless access point, etc., of the present example can include an interconnect 811 that couples computer readable storage media 812 such as a non-transitory type of media (i.e., any type of hardware storage medium) in which digital information can be stored and retrieved, a processor 813 (e.g., one or more processor devices of hardware), I/O interface 814, and a communications interface 817.

I/O interface 814 provides connectivity to a repository 480 and, if present, other devices such as a playback device, display screen, keypad (input resource 792), a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from remote sources and communicate with other computers. I/O interface 814 enables processor 813 to retrieve stored information from repository 480.

As shown, computer readable storage media 812 is encoded with server application 140-1 (e.g., software, firmware, etc.) executed by processor 813. Server application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in server application 140-1 stored on computer readable storage medium 812.

Execution of the server application 140-1 produces processing functionality such as server process 140-2 in processor 813. In other words, the server process 140-2 associated with processor 813 represents one or more aspects of executing server application 140-1 within or upon the processor 813 in the computer system 150.

Those skilled in the art will understand that the computer system 750 can include other processes and/or software and hardware components, such as an operating system that controls allocation and use of hardware resources to execute server application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Note that each of computer devices 150, access points 105, etc., can include a respective application of instructions, computer readable storage medium to store the instructions, and a processor to execute the instructions to carry out respective functions as discussed herein.

Functionality supported by the different resources will now be discussed via flowcharts in FIGS. 8-10. Note that the steps in the flowcharts below can be executed in any suitable order.

Figure 8:
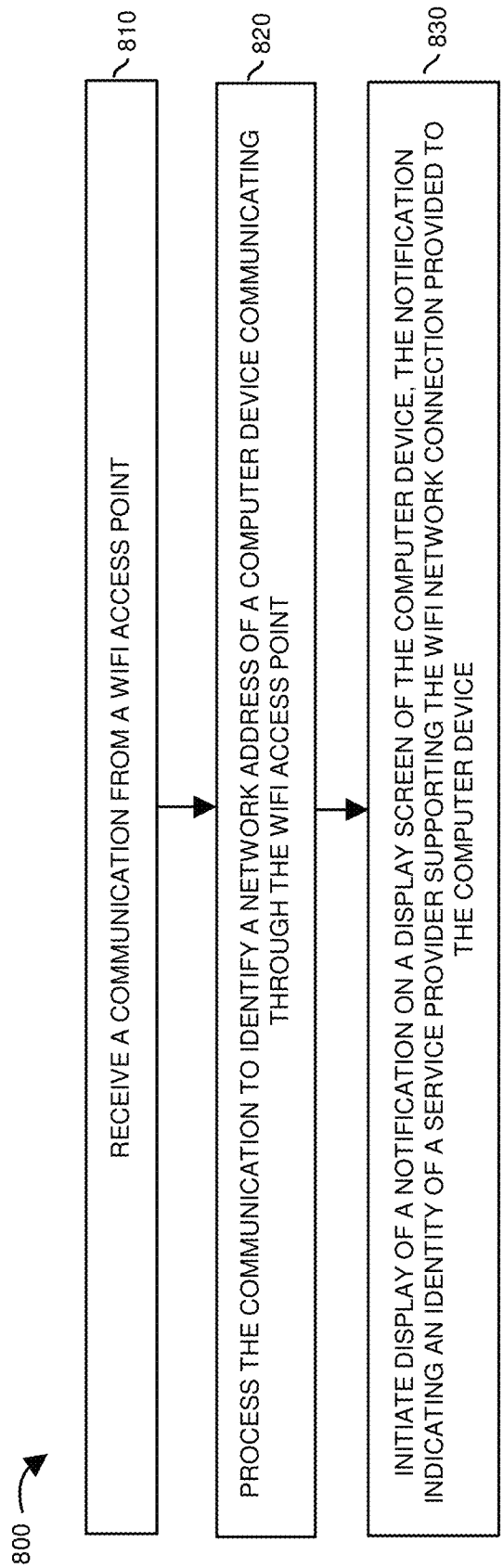
FIG. 8 is an example diagram illustrating a method of providing notification of a service provider associated with a wireless access point according to embodiments herein.

FIG. 8 is a flowchart 800 illustrating an example method according to embodiments. Note that there will be some overlap with respect to concepts as discussed above.

In processing block 810, the server resource 140 receives a communication from an access point 105-1.

In processing block 820, the server resource 140 processes the communication to identify a network address of a computer device communicating through the access point 105-1.

In processing block 830, the server resource 140 initiates display of a notification on a display screen 130 of the computer device 150-1. The notification indicates an identity of a service provider supporting the network connection provided to the computer device 150-1.

Figure 9:
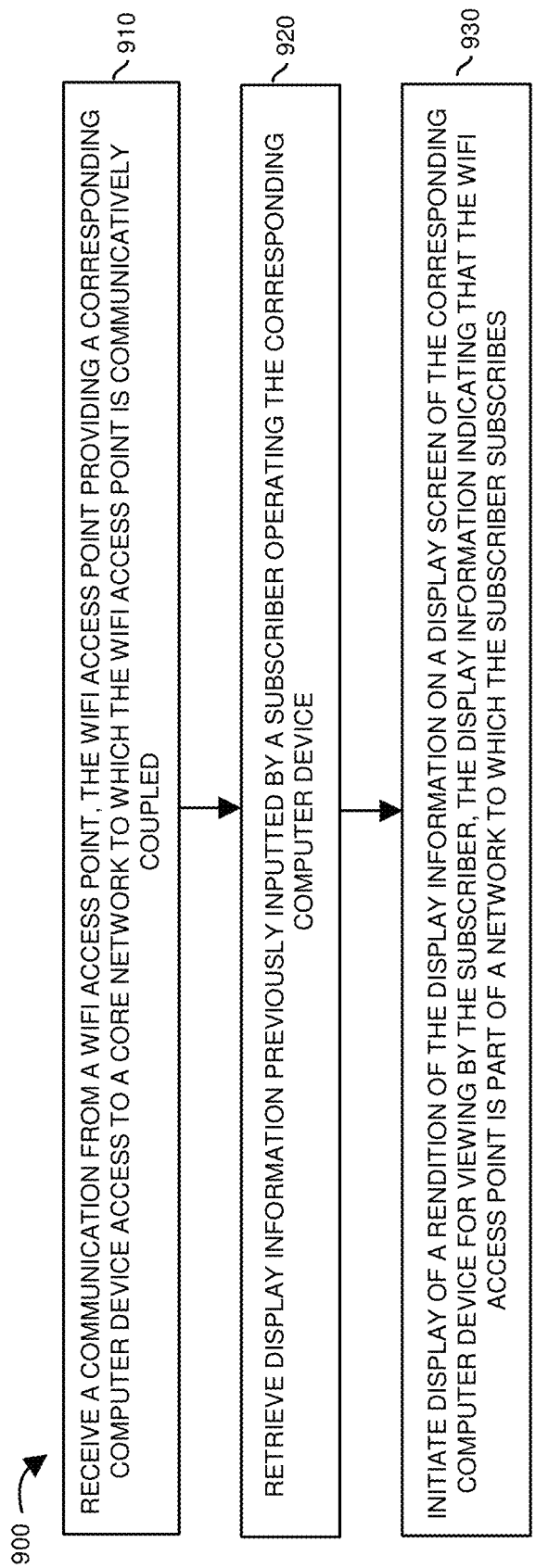
FIG. 9 is an example diagram illustrating a method of retrieval and distribution of a user's previously inputted display information to indicate that a corresponding wireless access point is part of a network to which the user subscribes according to embodiments herein.

FIG. 9 is a flowchart 900 illustrating an example method according to embodiments. Note that there will be some overlap with respect to concepts as discussed above.

In processing block 910, the server resource 140 receives a communication from access point 105-1. The access point 105-1 provides a corresponding computer device 150-1 access to a core network 190-1 to which the access point 105-1 is communicatively coupled.

In processing block 920, the server resource 140 retrieves display information (such as an image, a question, symbol, etc., in display information 110-2 or display information 110-3) previously inputted by a subscriber (e.g., user 108-1) operating the corresponding computer device 150-1.

In processing block 930, the server resource 140 initiates display of a rendition of the retrieved display information on a display screen 130 of the corresponding computer device 150-1 for viewing by the subscriber. The display information indicates that the access point 105-1 is part of a network to which the subscriber subscribes. Accordingly, the subscriber feels safe using the respective network connection.

Figure 10:
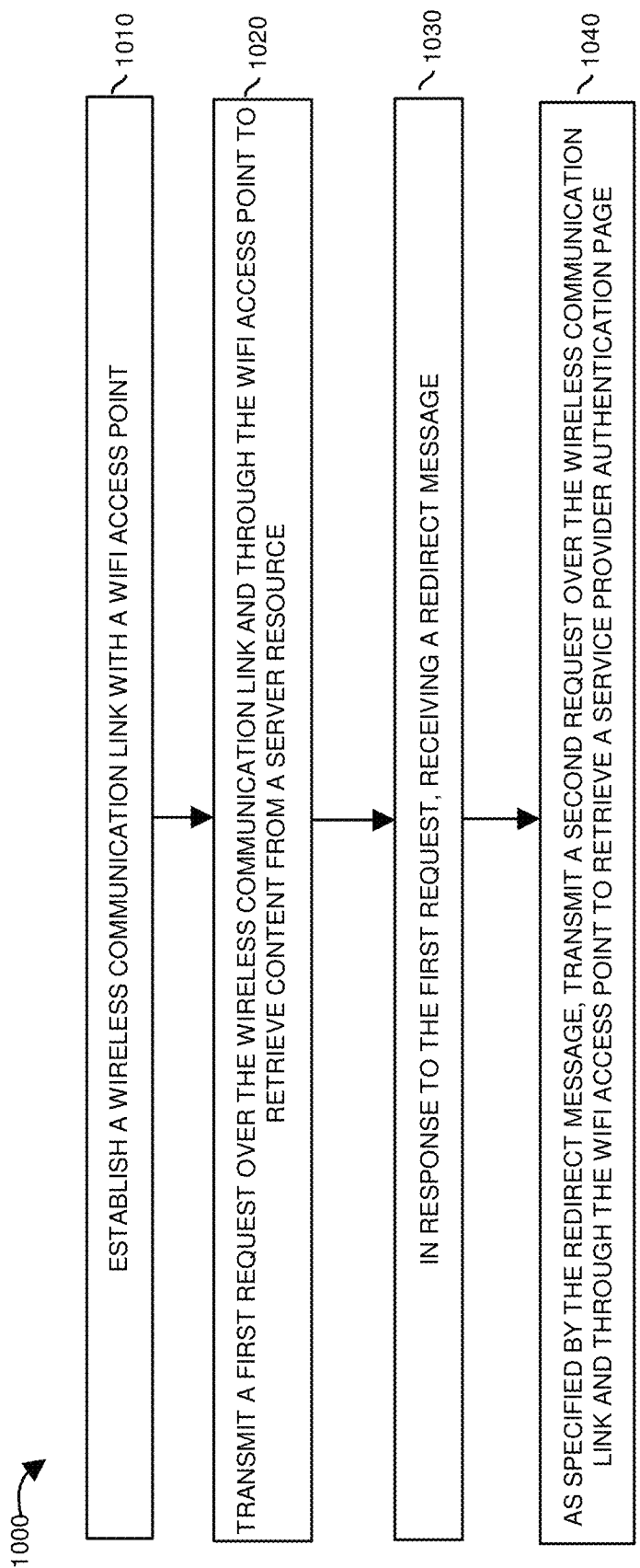
FIG. 10 is a diagram illustrating an example method of redirecting communications according to embodiments herein.

FIG. 10 is a flowchart 1000 illustrating an example method according to embodiments. Note that there will be some overlap with respect to concepts as discussed above.

In processing block 1010, the computer device 150-1 establishes a wireless communication link 128-1 with access point 105-1.

In processing block 1020, the computer device 150-1 transmits a first request over the wireless communication link 128-1 and through the access point 105-1 to retrieve content from a respective server resource.

In processing block 1030, in response to the first request, the computer device 150-1 receives a redirect message.

In processing block 1040, as specified by the redirect message, the computer device 150-1 transmits a second request over the wireless communication link 128-1 and through the access point 105-1 to retrieve a corresponding service provider's authentication page.

Note again that techniques herein are well suited for building trust and controlling access in a network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at a wireless access point operable to provide access to a network, receiving a communication from a mobile communication device over a wireless communication link;
    retrieving display information indicating that the wireless access point is part of a service provider network to which a user of the mobile communication device has access, the display information being unique information assigned to the user; and
    communicating the display information from the wireless access point to the mobile communication device, the communicated display information notifying the user of the mobile communication device that the wireless access point is part of the service provider network.

2. The method as in claim 1, wherein a rendition of the display information on a display screen of the mobile communication device notifies the user that subsequent communications from the wireless access point over the wireless communication link are secure.

3. The method as in claim 1 further comprising:
processing the received communication to obtain unique network address information assigned to the mobile communication device;
mapping the unique network address information to an identity of the user; and
mapping the identity of the user to the display information.

4. The method as in claim 1, wherein the display information is selected by the user prior to establishing the wireless communication link between the wireless access point and the mobile communication device.

5. The method as in claim 1 further comprising:
during registration of the user, which occurs prior to receiving the communication and use of the wireless access point by the mobile communication device:
receiving registration information from the user; and
storing the registration information, the registration information including the identity of the mobile communication device operated by the user.

6. The method as in claim 5 further comprising:
storing the registration information, the registration information including the display information, which is selected by the user.

7. The method as in claim 1 further comprising:
via communications from the wireless access point to the mobile communication device: presenting a challenge to the user to provide security information, the display information displayed on the display screen of the mobile communication device in response to the user providing the security information to the wireless access point.

8. The method as in claim 7, wherein the display information is an image selected by the user, display of the image on the display screen indicating that the user has been authenticated to use the wireless access point and access the network.

9. The method as in claim 1, wherein a rendition of the display information on a display screen of the mobile communication device notifies the user that subsequent communications from the wireless access point are conveyed over the service provider network.

10. The method as in claim 1 further comprising:
in response to receiving the communication from the mobile communication device, prior to communicating the display information to the mobile communication device, communicating a message to the mobile communication device, the message displaying an identity of the service provider network on a display screen of the mobile communication device.

11. The method as in claim 10, wherein the mobile communication device displays the message on the display screen, the message indicating a wireless service provided by the service provider network.

12. The method as in claim 10, wherein the message displayed on the display screen prompts the user with a selectable option to logon to the service provider network.

13. The method as in claim 12 further comprising:
communicating the display information from the wireless access point to the mobile communication device in response to the user selecting the selectable option to logon to the service provider network, the display information indicating that the user has logged onto the service provider network.

14. The method as in claim 1, wherein communication of the display information from the wireless access point to the mobile communication device is contingent upon the user providing appropriate security information to the wireless access point to use the service provider network.

15. The method as in claim 1 further comprising:
detecting the identity of the mobile communication device during association of the communication device with the wireless access point to establish the wireless communication link.

16. The method as in claim 1 further comprising:
in response to receiving the communication from the mobile communication device at the wireless access point: i) redirecting the mobile communication device to retrieve the display information; and ii) initiating display of a rendition of the display information on a display screen of the mobile communication device.

17. The method as in claim 16 further comprising:
obtaining unique network address information assigned to the mobile communication device; and
mapping the unique network address information to the display information.

18. The method as in claim 16, wherein the communication is a request for content from a particular server in the network, the method further comprising:
initially displaying the display information on the display screen of the mobile communication device in lieu of displaying the requested content on the display screen.

19. The method as in claim 18 further comprising:
displaying a selectable display region in the rendition of the display information displayed on the display screen, the selectable display region including corresponding text indicating that the content requested from the particular server is viewable via selection of the selectable display region.

20. A method comprising:
at a mobile communication device:
communicating over a wireless communication link with a wireless access point to access a network;
receiving display information indicating that the wireless access point is part of a service provider network to which a user of the mobile communication device has access, the display information being unique information assigned to the user; and
displaying a rendition of the display information received from the wireless access point on a display screen of the mobile communication device, the rendition of the display information notifying the user that the wireless access point is part of the service provider network.

21. The method as in claim 20, wherein the rendition of the display information on the display screen of the mobile communication device notifies the user that subsequent communications received over the wireless communication link from the wireless access point are secure.

22. The method as in claim 20, wherein the display information is selected by the user prior to establishing the wireless communication link between the wireless access point and the mobile communication device.

23. The method as in claim 20 further comprising:
via communications from the wireless access point to the mobile communication device: at the mobile communication device, receiving a challenge directed to the user of the mobile communication device to provide security information, the display information displayed on the display screen of the mobile communication device in response to the user providing the security information in response to the challenge.

24. The method as in claim 20, wherein the display information is an image selected by the user, display of the image on the display screen indicating that the user has been authenticated to use the wireless access point.

25. The system as in claim 24 further comprising:
via communications from the wireless access point to the mobile communication device: presenting a challenge to the user of the mobile communication device to provide security information, the display information displayed on the display screen of the mobile communication device in response to the user providing the security information.

26. The method as in claim 20, wherein a rendition of the display information on a display screen of the mobile communication device notifies the user that subsequent communications from the wireless access point are conveyed over the service provider network.

27. The method as in claim 20 further comprising:
prior to displaying the rendition of the display information from the wireless access point, receiving a message from the wireless access point at the mobile communication device; and
displaying the message on the display screen of the mobile communication device, the message indicating an identity of the service provider network.

28. The method as in claim 27, wherein the message further indicates a type of wireless service provided by the service provider network.

29. The method as in claim 28, wherein the message displayed on the display screen of the mobile communication device prompts the user with a selectable option to logon to the service provider network through the wireless access point.

30. The method as in claim 28 further comprising:
receiving the display information from the wireless access point in response to the user selecting the selectable option to logon to the service provider network.

31. A system comprising:
a wireless access point;
a wireless communication link between the wireless access point and a network; and
the wireless access point operable to:
receive a communication from a mobile communication device over the wireless communication link between the wireless access point and the mobile communication device;
receive display information indicating that the wireless access point is part of a service provider network to which a user of the mobile communication device has access, the display information being unique information assigned to the user; and
communicate the display information from the wireless access point to the mobile communication device, the display information notifying the user of the mobile communication device that the wireless access point is part of the service provider network.

32. The system as in claim 31, wherein a rendition of the display information on a display screen of the mobile communication device notifies the user that subsequent communications from the wireless access point are secure.

33. The system as in claim 31, wherein the wireless access point is further operable to:
process the received communication to obtain unique network address information assigned to the mobile communication device; and
initiate mapping of the unique network address information to the display information.

34. The system as in claim 31, wherein the display information is selected by the user prior to establishing the wireless communication link between the wireless access point and the mobile communication device.

35. The system as in claim 34, wherein the display information is an image selected by the user, display of the image on the display screen indicating that the user has been authenticated to use the wireless access point.

36. Computer-readable hardware storage having instructions stored thereon, the instructions, when carried out by computer processor hardware, causes the computer processor hardware to:
receive a communication from a mobile communication device over a wireless communication link between the wireless access point and the mobile communication device;
receive display information indicating that the wireless access point is part of a service provider network to which a user of the mobile communication device subscribes, the display information being unique information assigned to the user; and
communicate the display information from the wireless access point to the mobile communication device, the display information notifying the user of the mobile communication device that the wireless access point is part of the service provider network.

\* \* \* \* \*